(12) United States Patent
Miller et al.

(10) Patent No.: US 9,981,654 B2
(45) Date of Patent: May 29, 2018

(54) METHODS AND SYSTEMS FOR SURGE CONTROL

(71) Applicant: Ford Global Technologies, LLC, Dearborn, MI (US)

(72) Inventors: Kenneth James Miller, Canton, MI (US); Michael Howard Shelby, Plymouth, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 15/171,375

(22) Filed: Jun. 2, 2016

(65) Prior Publication Data

US 2017/0349164 A1  Dec. 7, 2017

(51) Int. Cl.

| | |
|---|---|
| *B60W 20/17* | (2016.01) |
| *B60W 20/13* | (2016.01) |
| *B60W 10/06* | (2006.01) |
| *B60W 10/08* | (2006.01) |
| *B60K 6/24* | (2007.10) |
| *B60K 6/40* | (2007.10) |
| *B60W 10/26* | (2006.01) |

(52) U.S. Cl.
CPC ............... *B60W 20/17* (2016.01); *B60K 6/24* (2013.01); *B60K 6/40* (2013.01); *B60W 10/06* (2013.01); *B60W 10/08* (2013.01); *B60W 10/26* (2013.01); *B60W 20/13* (2016.01); *B60W 2510/0633* (2013.01); *B60W 2540/10* (2013.01); *B60W 2710/0666* (2013.01); *B60W 2710/083* (2013.01); *B60W 2710/244* (2013.01); *B60Y 2200/92* (2013.01); *B60Y 2300/205* (2013.01); *Y10S 903/905* (2013.01); *Y10S 903/93* (2013.01); *Y10S 903/951* (2013.01)

(58) Field of Classification Search
CPC ...... B60W 20/17; B60W 20/13; B60W 10/06; B60W 10/08; B60W 10/26; B60K 6/40; B60K 6/24
USPC .......................................................... 701/22
See application file for complete search history.

(56) References Cited

U.S. PATENT DOCUMENTS

| | | | |
|---|---|---|---|
| 7,640,744 B2 | 1/2010 | Rollinger et al. | |
| 9,174,637 B2 | 11/2015 | Banker et al. | |
| 2014/0172206 A1* | 6/2014 | Roos | B60K 6/442 701/22 |
| 2015/0051762 A1* | 2/2015 | Banker | B60W 10/06 701/22 |

* cited by examiner

*Primary Examiner* — Yazan A Soofi
(74) *Attorney, Agent, or Firm* — David Kelley; McCoy Russell LLP

(57) ABSTRACT

Methods and systems are provided for improving surge control. When surge conditions are anticipated, motor torque usage is increased to discharge a battery to a lower state of charge. When surge conditions actually occur, engine torque output is limited to a higher level than the engine output required to meet the reduced torque demand, while the excess wheel torque is offset by charging the battery to a higher state of charge.

20 Claims, 6 Drawing Sheets

METHODS AND SYSTEMS FOR SURGE CONTROL

FIELD

The present application relates to methods and systems for turbocharger surge control.

BACKGROUND AND SUMMARY

Engine systems may be configured with boosting devices, such as turbochargers or superchargers, for providing a boosted air charge and improving peak power outputs. The use of a compressor allows a smaller displacement engine to provide as much power as a larger displacement engine, but with additional fuel economy benefits. However, compressors are prone to surge. For example, when an operator tips-out of an accelerator pedal, an engine intake throttle closes, leading to reduced forward flow through the compressor, and potentially compressor surge. Surge can lead to NVH issues such as undesirable noise from the engine intake system.

Compressor surge may be controlled by opening a compressor bypass valve (also known as a compressor recirculation valve) coupled in a bypass across the compressor to increase recirculation of boosted air from downstream of the compressor to upstream of the compressor. The resulting increase in compressor flow and reduction in compressor pressure ratio improves the compressor's margin to surge. One example of using a compressor bypass valve (CBV) for surge control is shown by Banker et al. in U.S. Pat. No. 9,174,637. Therein responsive to an indication of surge, a CBV is opened to dump boost pressure and increase compressor recirculation flow. In addition, throttle flow is reduced to a higher than desired level of airflow to move compressor operation away from the surge limit. The excess torque generated due to the higher than desired airflow is then addressed by increasing a load applied on the engine by an electric machine, such as by an electric motor.

However, the inventors have identified potential issues associated with reliance on a CBV. As one example, the CBVs add significant component cost. In engines configured with twin turbochargers, such as one turbocharger coupled to each engine bank, the costs are doubled. In addition to costs, there may also be durability concerns associated with excessive cycling of the CBVs. As such, this can result in warranty issues. Further, the addition of the CBV can add complexity to engine boost and torque control. In particular, the effects of the faster acting CBV can confound the control loop of a slower acting exhaust waste gate. Further still, the dumping of boost pressure by the CBV reduces boost efficiency.

The inventors have also identified issues with Banker's use of an electric machine during surge control. As one example, there may be conditions when the electric motor is not able to absorb the excess torque, such as when a battery coupled to the motor has a higher than threshold charge and is not able to accept further charge. If any excess torque remains, vehicle drivability may be affected. If spark timing is retarded to reduce the excess torque and improve vehicle drivability, the fuel penalty associated with the retarded spark timing could offset or surpass the boost loss associated with the opening of a CBV. As a result, vehicle fuel economy is degraded. If the throttle is adjusted to reduce airflow through the compressor at a slower rate, surge may not be appropriately addressed and a time to torque may be affected.

In one example, the above issues may be addressed by a method for an engine, comprising: in anticipation of compressor surge, operating the vehicle with a higher ratio of motor torque to engine torque; and in response to compressor surge, operating the vehicle with engine torque limited based on a surge limit, and motor torque adjusted based on the engine torque relative to a driver demand. In this way, motor torque usage for surge control may be optimized.

As one example, a hybrid vehicle may be configured with an electric motor coupled to an energy storage system (e.g., a battery) and a boosted engine including a turbocharger. During engine operation, an intake compressor of the turbocharger may be used for providing a boosted intake air charge. While operating with boost, a controller may monitor compressor conditions, such as a compressor flow rate, a compressor pressure ratio, etc., to determine if compressor surge is likely. As the compressor operation approaches a surge limit, the controller may increase usage of motor torque (relative to engine torque) to meet a driver demand. The relative usage of motor torque may be varied with the likelihood of (or margin to) surge, as well as current state of charge of the battery. As a result of the increased use of motor torque, the battery state of charge may start to deplete. When compressor surge does subsequently occur, for example responsive to a sudden drop in torque demand during an operator pedal tip-out, the controller may adjust one or more engine torque actuators to substantially immediately limit the engine torque output to a level based on the compressor surge limit. In particular, engine torque may be limited so that compressor operation moves away from the surge limit. For example, engine torque may be limited so that airflow through the compressor is above a surge inducing pressure ratio. Motor torque is then adjusted based on the engine torque to meet the driver demand. For example, the engine torque may be limited to a level where the engine torque exceeds the driver demand, while the excess torque is absorbed at the battery. Since the battery was previously depleted in anticipation of surge, the battery's ability to accept charge is enhanced, and use of an electric motor to absorb the excess torque for surge control is improved.

In this way, by increasing motor torque usage in anticipation of compressor surge, a battery's charge accepting ability at a time of compressor surge is increased. The technical effect of limiting an engine torque responsive to surge is that a compressor pressure ratio may be improved, surge may be mitigated, and surge related issues (such as NVH) are alleviated, while avoiding the cost and other issues associated with a compressor bypass valve. By using the previously depleted battery to absorb any excess torque remaining after limiting the engine torque, driver demand can be met without impacting vehicle drivability. In particular, a "run-on" feel created by the excess torque can be overcome. In addition, the reliance on spark retard for addressing the excess torque is reduced, improving fuel economy. Overall, surge can be reduced without degrading the operator's drive feel and while meeting the operator torque demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
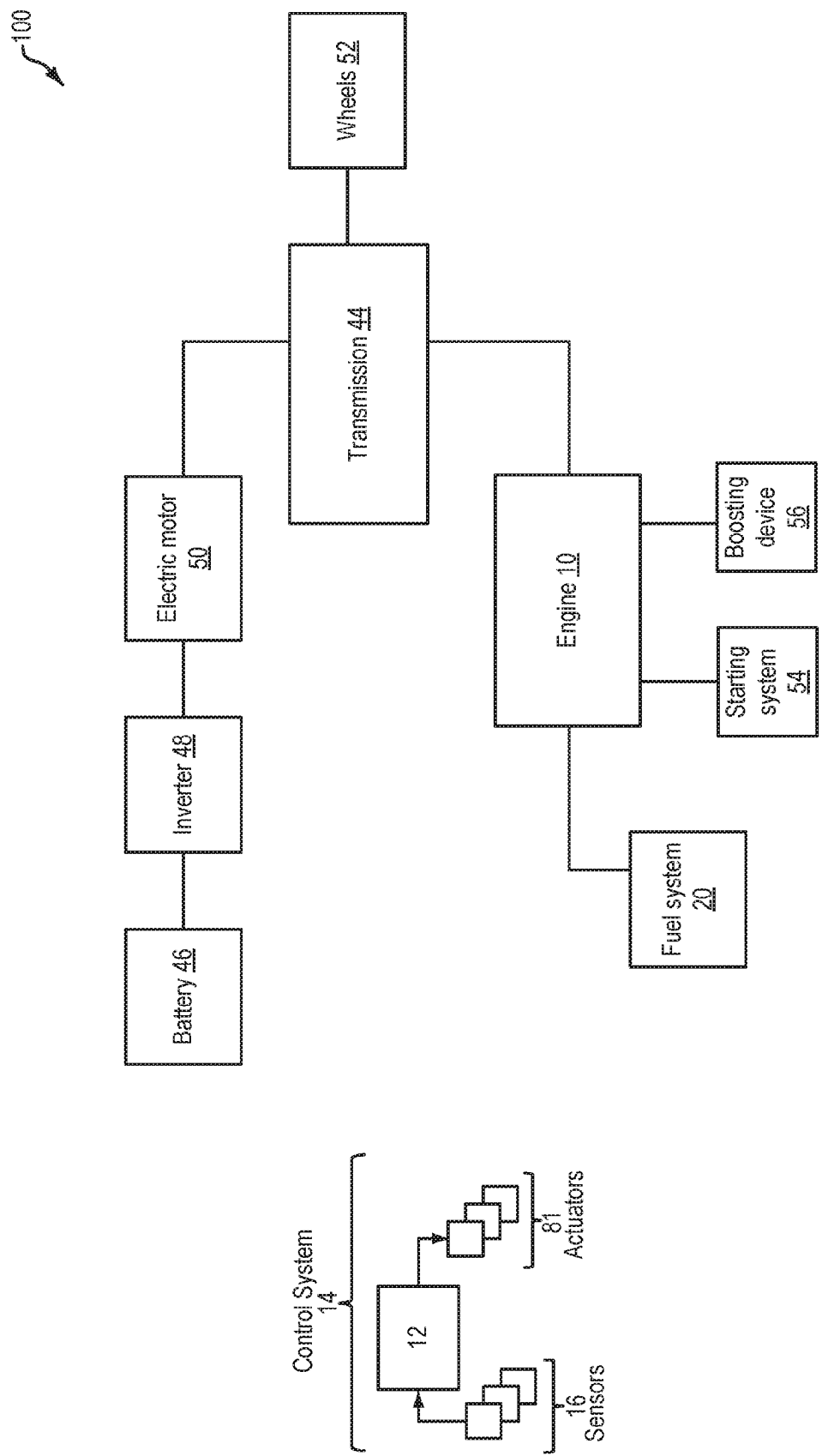
FIG. 1 shows a schematic depiction of a boosted engine system coupled in a hybrid electric vehicle system.
Figure 2:
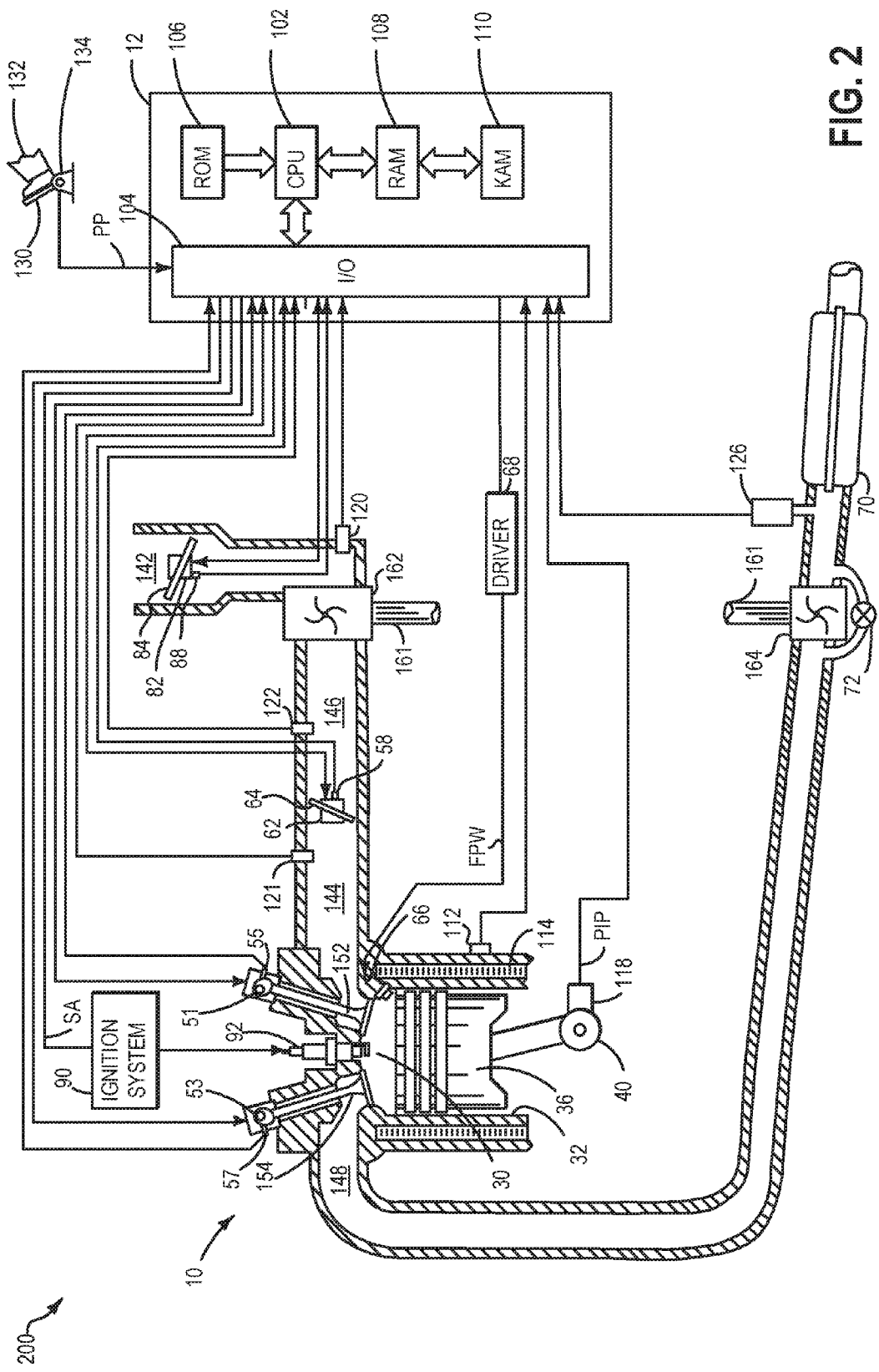
FIG. 2 shows an example combustion chamber of the boosted engine system.
Figure 4:
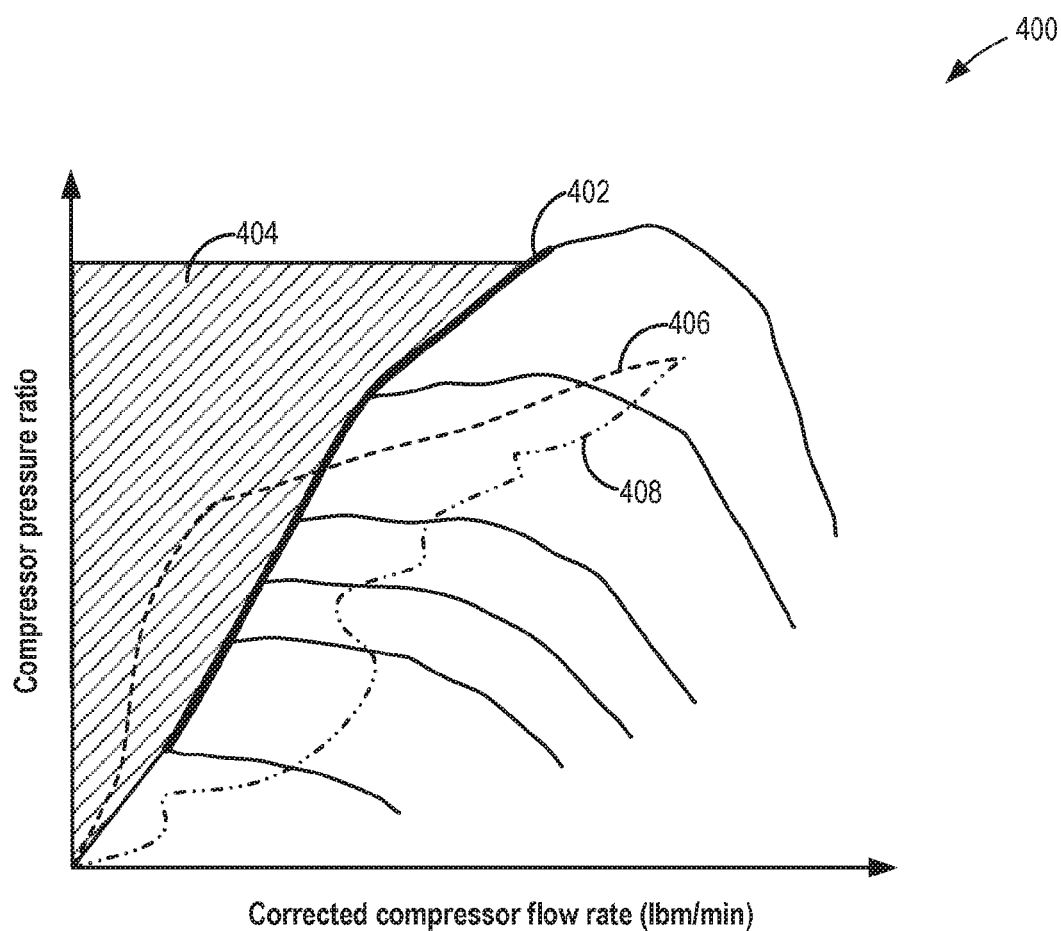
FIG. 4 shows a compressor map displaying a compressor surge limit.
Figure 5:
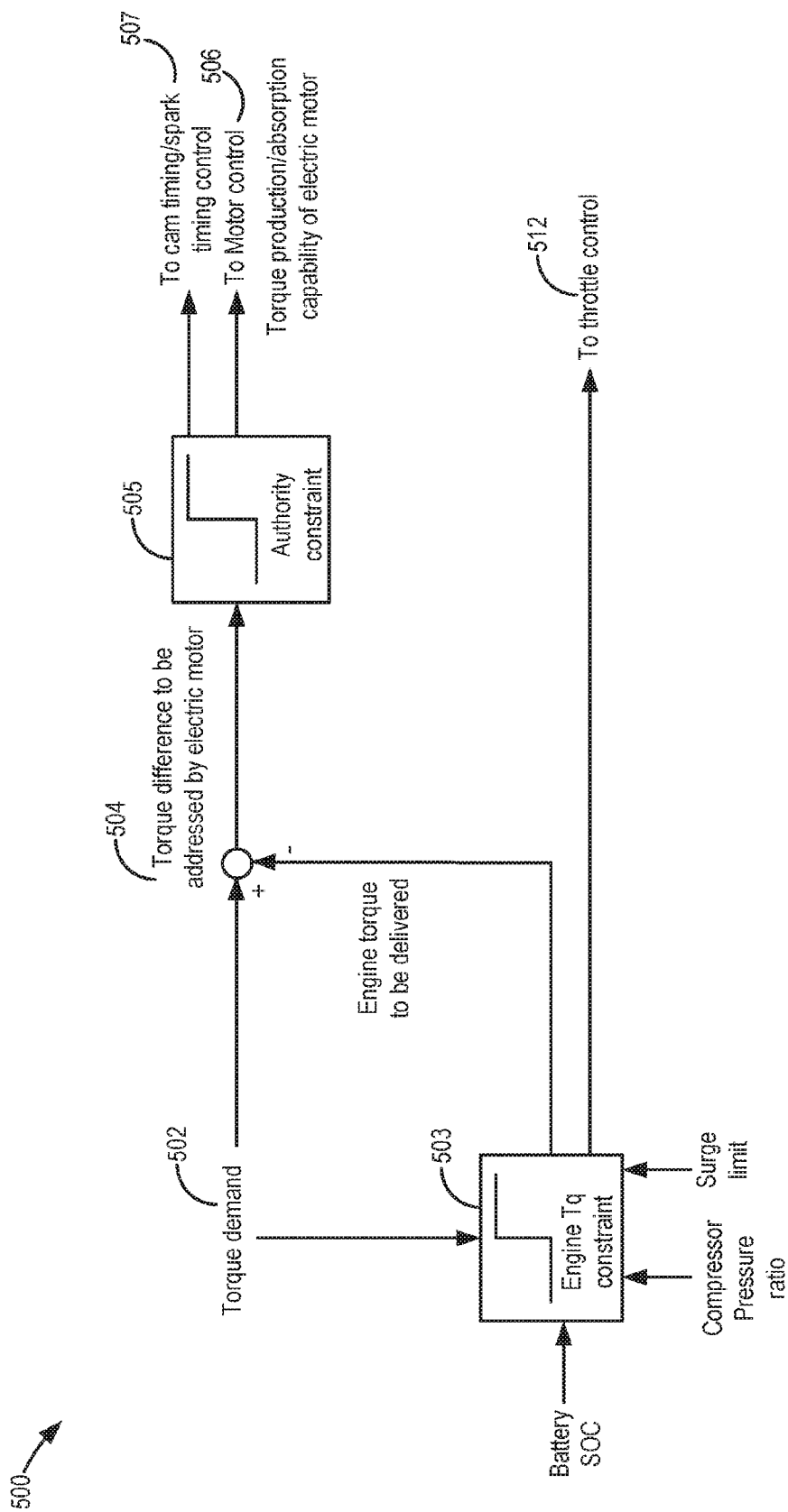
FIG. 5 shows an example block diagram for adjusting driver air demand and using motor torque compensations to address compressor surge.

The following description relates to systems and methods for addressing compressor surge in a boosted engine system, such as the system of FIG. 2, configured in a hybrid electric vehicle, such as the vehicle of FIG. 1. A controller may be configured to perform a control routine, such as the routine of FIG. 3, to increase usage of motor torque in anticipation of compressor surge so as to deplete an energy storage system to a lower state of charge. During the incidence of surge, the controller may then adjust engine actuators to limit engine torque to a level where compressor flow is moved away from a surge limit (FIGS. 4-5). An example adjustment is shown with reference to FIG. 6. In this way, motor torque usage for mitigating surge can be improved.

FIG. 1 depicts a hybrid propulsion system 100 for a vehicle. In the depicted embodiment, the vehicle is a hybrid electric vehicle (HEV). Hybrid propulsion system 100 includes an internal combustion engine 10. Engine 10 is coupled to transmission 44. Transmission 44 may be a manual transmission, automatic transmission, or combinations thereof. Transmission 44 may include a gear set having a plurality of gears. Further, various additional components may be included, such as a torque converter, a final drive unit, etc. Transmission 44 is shown coupled to drive wheels 52, which may contact a road surface.

Transmission 44 may alternatively be driven by an electric motor 50. In the depicted embodiment, the motor is a battery-powered electric motor wherein electric motor 50 is powered by energy stored in battery 46. Other energy storage devices that may be used to power motor 50 include a capacitor, a flywheel, a pressure vessel, etc. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. When operated in the regenerative mode, electric motor 50 may apply a load on the engine, thereby providing a negative torque on the driveline. Furthermore, electric motor 50 may be operated as a motor or generator, as required, to augment or absorb torque.

In some embodiments, as depicted, engine 10 may be a boosted engine coupled to a boosting device 56 for providing a boosted air charge to the engine. In one example, as elaborated with reference to FIG. 2, boosting device 56 may be a turbocharger including an exhaust turbine coupled to an intake compressor along a shaft. Therein, flow of exhaust gas through the turbine may spin the turbine, which then drives the compressor. The compressor may then compress intake air before delivering boosted air to the engine. In other examples, the boosting device may be a supercharger wherein an intake compressor is driven by an electric motor or the engine crankshaft. By using boosted air, engine performance and peak power outputs can be improved.

Engine 10 may be started with an engine starting system 54, including a starter motor. In one example, the starter motor coupled to the engine may be battery-operated, wherein the starter motor is driven by energy from battery 46. In another example, the starter motor may be a crank integrated starter generator (CISG). In yet another example, the starter motor may be a belt-driven integrated starter generator (BISG). In still another example, the starter may be a powertrain drive motor, such as a hybrid power-plant connected to the engine by way of a coupling device. The coupling device may include a transmission, one or more gears, and/or any other suitable coupling device. The starter may be configured to support engine restart at or below a predetermined near zero threshold speed (e.g., below 50 or 100 rpm). In other words, by operating the starter motor of starting system 54, the engine 10 may be spun and cranked.

Hybrid propulsion system 100 may be operated in various embodiments including a full hybrid system, wherein the vehicle is driven by only the engine, only the electric motor, or a combination of both. Alternatively, assist or mild hybrid embodiments may also be employed, wherein the engine is the primary source of torque, and the electric motor selectively adds torque during specific conditions, such as during a tip-in event. Accordingly, hybrid propulsion system 100 may be operated in various modes of operation. For example, during an "engine-on" mode (also referred to as an engine mode), engine 10 may be operated and used as the primary source of torque for powering wheels 52. During the "engine-on" mode, fuel may be supplied to engine 10 from fuel system 20 including a fuel tank. The fuel tank may hold a plurality of fuels, such as gasoline, or fuel blends, such as fuel with a range of alcohol (e.g., ethanol) concentrations including E10, E85, etc., and combinations thereof. In another example, during an "engine-off" mode (also referred to as an electric mode), electric motor 50 may be operated to power the wheels. The "engine-off" mode may be employed during braking, low speeds, while stopped at traffic lights, etc. In still another example, during an "assist" mode, the motor torque may supplement and act in cooperation with the torque provided by engine 10.

Hybrid propulsion system 100 may further include control system 14. Control system 14 is shown receiving information from a plurality of sensors 16 (various examples of which are described at FIG. 2) and sending control signals to a plurality of actuators 81 (various examples of which are described at FIG. 2). As one example, sensors 16 may include various pressure and temperature sensors, a fuel level sensor, air flow sensors, various exhaust gas sensors, torque sensors, etc. The control system may also send control signals to the actuators 81 based on input received from a vehicle operator and the plurality of sensors 16. The various actuators may include, for example, the transmission, transmission gears, fuel injectors, an air intake throttle coupled to the engine intake manifold, pumps, electric motor 50, etc. The control system 14 may include a controller 12. The controller may receive input data from the various sensors or buttons, process the input data, and trigger the actuators in response to the processed input data based on instruction or code programmed therein corresponding to one or more routines. For example, based on input from an intake airflow or pressure sensor indicative of a likelihood of compressor surge, the controller may send a signal to spin the electric motor thereby increasing usage of motor torque to meet a driver demand. An example control routine is described herein with regard to FIG. 3.

As such, engine 10 comprises a plurality of cylinders. Referring to FIG. 2, one cylinder or combustion chamber is described in detail at map 200. The various components of engine 10 may be controlled by electronic engine controller 12. Engine 10 includes combustion chamber 30 and cylinder walls 32 with piston 36 positioned therein and connected to crankshaft 40. Combustion chamber 30 is shown communicating with intake manifold 144 and exhaust manifold 148 via respective intake valve 152 and exhaust valve 154. Each intake and exhaust valve may be operated by an intake cam 51 and an exhaust cam 53. Alternatively, one or more of the intake and exhaust valves may be operated by an electro-mechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (such as fuel system 20 of FIG. 1) including a fuel tank, fuel pump, and fuel rail. Fuel injector 66 is supplied operating current from driver 68 which responds to controller 12. In still further examples, each cylinder may be configured with multiple injectors including multiple direct injectors, port injectors, or a combination thereof.

Intake manifold 144 is shown communicating with optional electronic throttle 62 which adjusts a position of throttle plate 64 to control airflow to engine cylinder 30. This may include controlling airflow of boosted air from intake boost chamber 146. A single air intake system throttle (AIS throttle) 82 is coupled to air intake passage 142 and located upstream of the boost chamber 146.

In some embodiments, engine 10 is configured to provide exhaust gas recirculation, or EGR. When included, EGR is provided via an EGR passage and EGR valve to the engine air intake system at a position downstream of air intake system (AIS) throttle 82 from a location in the exhaust system downstream of turbine 164 for low pressure EGR. Alternatively, EGR may be drawn from upstream of the turbine and delivered to downstream of the compressor for high pressure EGR. EGR may be drawn from the exhaust system to the intake air system when AIS throttle 82 is partially closed. Throttle plate 84 controls air pressure at inlet of compressor 162. The AIS may be electrically controlled and its position may be adjusted based on optional position sensor 88.

Compressor 162 draws air from air intake passage 142 to supply boost chamber 146. In some examples, air intake passage 142 may include an air box (not shown) with a filter. Exhaust gases spin turbine 164 which is coupled to compressor 162 via shaft 161. A vacuum operated waste gate actuator 72 allows exhaust gases to bypass turbine 164 so that boost pressure can be controlled under varying operating conditions. In alternate embodiments, the waste gate actuator may be pressure or electrically actuated. Waste gate 72 may be closed (or opening may be decreased) in response to increased boost demand, such as during an operator pedal tip-in. By closing the waste gate, exhaust pressures upstream of the turbine can be increased, raising turbine speed and peak power output. This allows boost pressure to be raised. In another example, waste gate 72 may be opened (or opening may be increased) in response to decreased boost demand, such as during an operator pedal tip-out. By opening the waste gate, exhaust pressures can be reduced, reducing turbine speed and power. This allows boost pressure to be lowered.

In some embodiments, the engine may include a compressor bypass valve, CBV (not depicted in the current embodiment), to provide a path around compressor 162 so that air may move from the compressor outlet to the compressor inlet so as to reduce a pressure that may develop across compressor 162. When included, the CBV may be opened and closed via an electric signal from controller 12. For example, the CBV may be opened in response to an indication of compressor surge during an operator pedal tip-out. By opening the CBV, boost pressure can be dumped upstream of the compressor to reduce the pressure differential across the compressor, thereby moving the compressor operation away from a surge limit/region.

While a CBV can be used to effectively address surge, there may be various issues associated with CBV usage. For example, CBVs add significant component cost and control complexity to engine systems. In addition, there may be durability concerns associated with excessive cycling of the CBVs which can result in warranty issues. In view of these issues, the inventors herein have recognized that surge can be addressed in an engine system without relying on a CBV (or while limiting CBV usage). As elaborated with reference to FIG. 3, responsive to surge, an engine torque output may be limited as a function of the surge limit so as to move the compressor operation away from the surge region. If the limited engine torque results in excess wheel torque, the excess torque may be absorbed at an energy storage device (such as the battery of FIG. 1) by operating an electric motor (such as the electric motor of FIG. 1) as a generator. To further improve the surge-mitigating effect of the motor torque, prior to the actual incidence of surge, in anticipation of surge, motor torque usage for meeting a driver demand may be increased. This allows the battery state of charge to be depleted to a level where it is better able to accept the charge during the subsequent incidence of surge. This allows surge to be addressed without relying on a CBV, obviating CBV related issues. At the same time, tip-out deceleration requirements may be better met.

A controller may use a map, such as the map of FIG. 4, to identify whether the compressor is operating in or around a surge region, as well as to determine if surge is anticipated. In particular, map 400 of FIG. 4 shows a change in compressor pressure ratio (along the y-axis) at different compressor flow rates (along the x-axis). Line 402 shows a surge line (or surge limit) for the given operating conditions. Compressor operation to the left of surge line 402 results in operation in a hard surge region 404 (depicted as shaded region 404). Compressor operation in hard surge region 404 results in objectionable NVH and potential degradation of engine performance.

Dashed line 406 depicts how compressor surge can occur during a tip-out. In particular, during a tip-out, when the throttle is rapidly closed to meet driver torque demand, flow through the compressor can decrease very quickly, while compressor exit pressure decreases relatively slowly. This forces compressor operation to the left of surge line 402 and into hard surge region 404. When operating in this region, engine torque may be limited so as to move compressor operation away from both the surge line and the hard surge region (for example, into a soft surge region to the right of surge line 402) where NVH is less objectionable. For example, engine torque may be limited so as to move the compressor operation according to the trajectory depicted at line 408.

Returning to FIG. 2, distributorless ignition system 90 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 2 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator pedal position (PP) adjusted by a foot 132 of a vehicle operator; a knock sensor for determining ignition of end gases (not shown); a measurement of engine manifold pressure (MAP) from pressure sensor 121 coupled to intake manifold 144; a measurement of engine manifold air flow (MAF) from flow sensor 120 coupled to intake passage 142; a measurement of boost pressure from pressure sensor 122 coupled to boost chamber 146; an engine position sensor from a Hall effect sensor 118 sensing crankshaft 40 position; and a measurement of throttle position from sensor 58. Barometric pressure may also be sensed (sensor not shown) for processing by controller 12. In one aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle, such as shown in FIG. 1. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 152 and exhaust valve 154 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is described merely as an example, and that intake and exhaust valve opening and/or closing timings may vary, such as to provide positive or negative valve overlap, late intake valve closing, or various other examples.

In this way, the system of FIGS. 1-2 enables a method for a vehicle system, comprising: during an increase in driver demand, discharging a battery to a state of charge based on a predicted margin to surge at a subsequent decrease in driver demand; and during the subsequent decrease in driver demand, limiting an engine torque based on an actual margin to surge, and charging the battery by absorbing powertrain torque in excess of the decreased driver demand. In one example, the predicted margin to surge is based on the increase in driver demand, and discharging the battery to the state of charge includes discharging the battery from an initial state of charge to a final state of charge, wherein the final state of charge is further based on the initial state of charge at a time of the increase in driver demand, the final state of charge lowered as one or more of the initial state of charge increases and the predicted margin to surge at the subsequent decrease in driver demand decreases. In a further example, limiting engine torque based on an actual margin to surge includes adjusting one or more engine torque actuators to maintain a compressor inlet pressure below a surge pressure, the one or more engine torque actuators include an intake throttle, an exhaust waste gate valve, and a fuel injector. Additionally, limiting the engine torque includes reducing an opening of the intake throttle to a larger opening than required for the decreased driver demand, and adjusting the fuel injection based on the reduced intake throttle opening.

Figure 3:
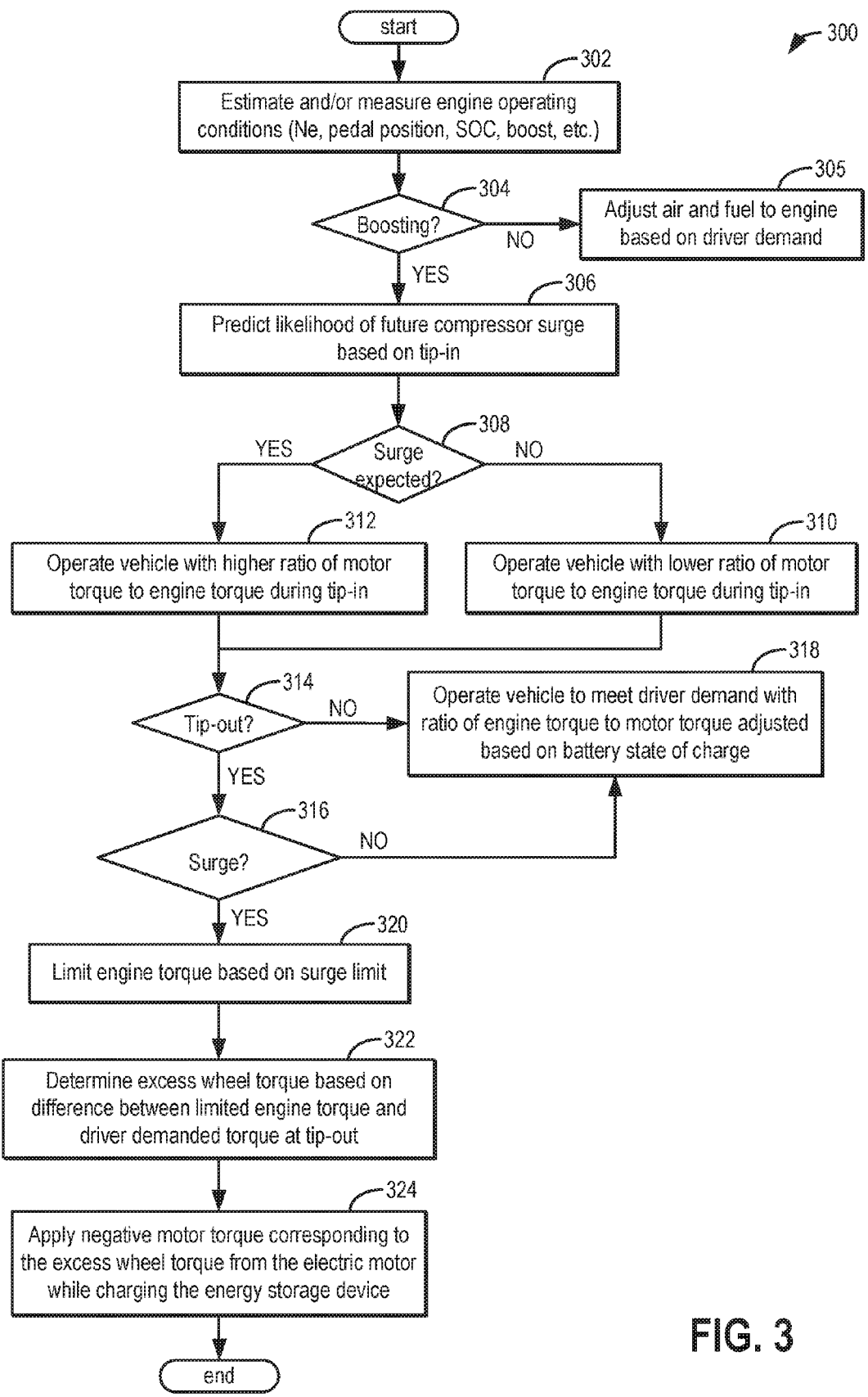
FIG. 3 shows a high level flow chart illustrating a routine that may be implemented for adjusting motor torque usage in anticipation of, as well as during compressor surge.

Now turning to FIG. 3, an example routine 300 is shown for addressing compressor surge by limiting an engine torque and using torque compensations from an electric motor to improve drive feel in a hybrid vehicle system. The method reduces the reliance on a CBV for surge control.

At 302, the routine includes estimating and/or measuring engine and vehicle operating conditions. These include, for example, engine speed, pedal position, boost level, driver torque demand, BP, MAP, MAF, state of charge (SOC) of an energy storage device (such as a system battery), engine coolant temperature, exhaust catalyst temperature, turbine speed, etc.

At 304, a boosting event may be confirmed. For example, boosting may be confirmed in response to MAP being above a threshold. In one example, confirming a boosting event includes confirming an accelerator pedal tip-in (such as when accelerator pedal is depressed by the vehicle operator and vehicle acceleration is requested) or an increase in MAF or increase in driver demanded torque. If boosting is not confirmed, at 305, the control system may continue operating the engine with airflow and fuel injection adjusted based on a current driver torque demand to enable combustion at an air-fuel ratio based on the operating conditions. For example, stoichiometric combustion (or an alternate desired combustion air-to-fuel ratio, such as richer than stoichiometry or leaner than stoichiometry) may be maintained while meeting the driver demand. In addition, the control system may choose one or more of engine torque from the engine and motor torque from an electric motor to meet the current driver demand. The routine then ends.

If boosting is confirmed, then at 306, a likelihood of future compressor surge is predicted and it is determined if compressor surge is anticipated. For example, it is determined if compressor surge may occur during a subsequent operator pedal tip-out event. Herein, the predicted surge is an anticipation of (and before) actual surge. The controller may anticipate a predicted drop in driver demand during an operator pedal tip-out event following the current boosting event based on a degree of pedal displacement during the boosting event. The predicted drop in driver demand may be increased as the degree of boosting during the boosting event increases. For example, the predicted drop in driver demand may be increased as a pedal displacement during a tip-in of the boosting event increases. That is, a higher degree of deceleration (or a drop to a lower vehicle speed) may be expected following a higher degree of acceleration (or a rise to a higher vehicle speed). The predicted drop in driver demand may also be based on the final boost pressure requested at the boosting event, the drop increased as the final boost pressure increases. As such, the controller may also determine a charging potential associated with the predicted drop in driver demand, the charging potential increased as the predicted drop in driver demand increases. The inventors have recognized that during a drop in driver demand from boosted conditions, when the throttle is rapidly closed, flow through the compressor may decrease very quickly, while compressor exit pressure decreases relatively slowly, resulting in compressor surge. Also during the tip-out, the vehicle is required to reduce acceleration to the driver requested speed rapidly (e.g., in less than 1 or 2 seconds). During such conditions, the required wheel torque may be delivered by limiting engine torque while sending excess engine power to charge the battery. Thus the charging potential of the subsequent tip-out event may be calculated.

At 308, it may be determined if surge is expected, such as if the likelihood of surge is higher than a threshold. Alternatively, it may be determined if the charging potential is lower than a threshold. If yes, then at 312, in anticipation of compressor surge, the vehicle may be operated with a higher ratio of motor torque to engine torque during the boosting event. That is, a higher portion of the driver demanded torque may be provided via the electric motor while discharging an energy storage device coupled to the electric motor, while the remaining smaller portion of the driver demanded torque is provided via the engine. The higher ratio of motor torque to engine torque may be based on a state of charge (SOC) of the energy storage device coupled to the electric motor providing the motor torque, such as a system battery. For example, the ratio of motor torque to engine torque may be increased as the state of charge of the energy storage device increases. The amount of increase may be lower for lower states of charge and higher for higher states of charge. Operating the vehicle with the higher ratio of motor torque to engine torque includes discharging the energy storage device to a lower state of charge, the lower state of charge based on the charging potential during the compressor surge. The lower state of charge may be decreased as the charging potential during the compressor surge increases. As such, the charging potential increases as one or more of the predicted drop in driver demand increases, and as a predicted initial boost pressure at a time of the subsequent operator pedal tip-out event increases. The higher ratio of motor torque to engine torque may be further based on a margin to compressor surge, the ratio of motor torque to engine torque increased as the margin to compressor surge decreases. The margin to compressor surge may be based on one or more of a compressor inlet pressure relative to a surge pressure, a compressor flow relative to a surge flow, and a compressor pressure ratio relative to a surge ratio.

In other words, when the battery state of charge is higher (and its charging potential is lower), more motor torque may be used on the boosting event responsive to the predicted surge than would have otherwise been used, thereby discharging the battery on the boosting event to a lower state of charge. By draining the battery during the acceleration, the battery's charging potential at the subsequent tip-out is increased.

In one example, the controller may evaluate if there is enough battery charge power limit available by comparing a battery charge limit to the anticipated battery charge needed during the predicted surge to determine a delta/difference between the engine power profile needed to prevent anticipated surge and the wheel power profile required to meet tip-out deceleration requirements. Then, if there is insufficient battery charge limit, the controller may discharge the battery to a lower SOC by applying more battery power and less engine power during the acceleration.

If the likelihood of surge is lower than the threshold, or if the charging potential is higher than the threshold, then at 310, in anticipation of no compressor surge, the vehicle may be operated with a lower ratio of motor torque to engine torque during the boosting event. That is, a lower portion of the driver demanded torque may be provided via the electric motor while discharging the energy storage device coupled to the electric motor, while the remaining higher portion of the driver demanded torque is provided via the engine.

From each of 310 and 312, the method moves to 314 wherein a tip-out event may be confirmed. For example, a tip-out may be confirmed in response to an accelerator pedal being released by the vehicle operator, and an operator requesting a deceleration. As such, the tip-out may indicate a sudden drop in torque and boost demand. If a tip-out is not confirmed, at 318, the control system may continue operating the vehicle with a ratio of motor torque to engine torque adjusted to meet the driver demand, the ratio adjusted based on a state of charge of the system battery and the driver demand. An engine airflow and fuel injection may be adjusted based on the engine torque ratio to enable combustion at an air-fuel ratio based on the operating conditions, for example, stoichiometric combustion (or an alternate desired combustion air-to-fuel ratio, such as richer than stoichiometry or leaner than stoichiometry). The routine then ends.

At 316, it may be determined if surge is occurring. As such, this includes an actual incidence of surge, distinct from the anticipation/prediction of surge during the preceding boosting event. Surge may be confirmed based on a compressor pressure ratio and/or compressor flow relative to a surge limit. In one example, surge may be indicated in response to a margin to the surge limit being lower than a threshold.

It will be appreciated that while the compressor surge addressing routine of FIG. 3 confirms a tip-out induced surge at 314-316, in alternate embodiments, the compressor surge routine may be initiated in response to the intake throttle being closed relatively quickly. For example, at 314-316, it may be determined if engine air demand has been reduced for a transmission shift, to enable traction control, etc.

If surge is not confirmed, the routine returns to at 318 to continue operating the vehicle with a ratio of motor torque to engine torque adjusted based on a state of charge of the system battery to meet the decreased driver demand. For example, engine airflow and fuel injection may be decreased while maintaining combustion at a requested air-fuel ratio, for example at or around a stoichiometric air-fuel ratio. The routine then ends.

If surge is confirmed, then at 320, the method includes operating the vehicle with engine torque limited based on the surge limit. Operating the vehicle with engine torque limited based on the surge limit may include adjusting one or more engine torque actuators to maintain one or more of a compressor inlet pressure below the surge pressure, a compressor flow above a surge flow, and a compressor pressure ratio below a surge ratio. In another example, the one or more engine torque actuators may be adjusted to increase the margin to the surge limit to higher than the threshold. The one or more engine torque actuators adjusted may include, for example, an intake throttle, an exhaust waste gate valve, a variable camshaft timing actuator, and a fuel injector. As an example, the adjusting may include one or more of reducing an intake throttle opening, increasing an exhaust waste gate valve opening, changing camshaft timing, and reducing the fuel injection amount (or changing the timing of fuel injection). In addition, a spark timing may be retarded from MBT. In one example, engine torque may be limited so as to move the compressor operation away from the surge region, according to the trajectory depicted at line 408 of FIG. 4.

At 322, an excess wheel torque may be determined based on the limited engine torque relative to the driver demanded torque at the surge-inducing tip-out. At 324, motor torque may be adjusted based on the limited engine torque relative to the decreased driver demand. In one example, the controller may calculate an excess wheel torque based on the limited engine torque relative to the driver demand, and apply negative motor torque corresponding to the excess wheel torque from the electric motor while charging the system battery (or an alternate energy storage device coupled to the electric motor). In still other examples, in addition to or in place of the battery, negative torque may be applied from another electric machine of the vehicle system, such as from a starter/generator or an alternator.

It will be appreciated that the negative torque applied by the electric motor may be limited based on the charging potential of the battery. While this is pre-emptively increased by discharging the battery more (via the higher motor torque usage) during the preceding boosting event, the negative torque required may be higher than the charging potential of the battery during the actual incidence of surge. If the battery cannot accept further charge (such as when the SOC is higher despite the pre-emptive discharging), an engine torque actuator, such as one or more of cam timing and spark ignition timing, may be adjusted to reduce the engine torque.

In one example, the controller may determine a desired minimum engine torque and a torque-rate limit as a function of the surge limit (such as a margin to surge line 402 of FIG. 4) and a battery power limit (or battery SOC). The controller may then compare the driver demanded torque at tip-out, as well as the driver demanded time to the reduced torque, to the torque requirement corresponding to the demanded deceleration (both amount and time). By limiting the engine torque to move the compressor away from the surge region while charging the battery with the excess torque, the controller may better enable the wheel power to respond (herein reduce) to the reduced level within the requested time since the driver demanded tip-out.

As one example, the controller may determine a desired engine intake airflow based on the reduced torque demand and the compressor surge limit. For example, as the torque demand drops, a smaller airflow to the engine may be desired to provide the desired torque. In one example, the demand based airflow may be a first, lower airflow amount. In addition to determining the first airflow, a first throttle flow and a first throttle setting (e.g., a first throttle opening) associated with the first intake airflow may be determined. As the margin to surge decreases, however, the engine intake airflow required to mitigate surge and maintain engine compressor operation outside of the surge region may increase. In one example, the surge based airflow may be a second airflow amount, higher than the first airflow amount, a difference between the second airflow and the first airflow increasing as the margin to surge decreases. In other words, as the surge limit is approached or exceeded, the second airflow may be raised further above the first airflow. In addition to determining the second airflow, a second throttle flow and a second throttle setting (e.g., a second throttle opening) associated with the second intake airflow may be determined. Thus, the desired engine intake airflow based on the surge limit may exceed the desired engine intake airflow based on the reduced torque demand. In addition, the desired engine airflow may be adjusted based on battery limit constraints. That is, if the excess airflow determined as a difference between the surge mitigating second airflow and the demand based first airflow corresponds to an excess torque that is more than the charging potential of the system battery (higher than battery limit), then the desired final engine intake airflow may be reduced from the surge mitigating second airflow towards the demand based first airflow.

In addition to modifying the engine intake airflow to be higher than the first airflow so as to provide a greater than demanded airflow to the engine, a rate of reducing the engine airflow may also be adjusted in view of the surge constraint. For example, engine intake airflow may be reduced at a slower rate to the second airflow so that the reduced torque level is attained slowly. As one example, the air intake throttle may be closed slowly (or an opening may be decreased slowly) so as to reduce the airflow amount slowly, thereby providing more engine torque output than demanded. By limiting reduction of airflow responsive to the tip-out, the pressure differential across the compressor can be reduced, and compressor flow can be increased, thereby moving the compressor further away from hard and soft surge limits.

Once the engine intake airflow is adjusted, fuel injection to the engine may be adjusted based on the reduced airflow to maintain stoichiometric combustion. For example, as the engine airflow is reduced, the fuel injection may be reduced. However, since the reduction of airflow is limited, the fuel injection amount delivered may be more than the fuel injection amount required for the drop in driver demand at the tip-out. It will be appreciated that while the routine suggests adjusting the fuel injection based on the modified airflow to maintain stoichiometric combustion, in alternate embodiments, based on nominal operating conditions, an alternate air-fuel ratio (AFR) may be required (e.g., richer or leaner than stoichiometry). Therein, the controller may adjust the fuel injection based on the modified airflow amount to provide the desired combustion AFR. For example, the fuel injection may be adjusted to operate the engine leaner than stoichiometry for emissions purposes. In addition to fuel injection adjustments, spark timing adjustments may also be performed based on the modified airflow amount.

As a result of limiting the engine torque by delivering more airflow and fuel than is required, the engine may output more torque than is demanded at the tip-out. That is, there may be excess engine torque being output. The excess torque may be estimated based on a difference between the modified airflow and the desired airflow. For example, the excess torque may be estimated based on a difference between the second airflow amount and the first airflow amount. The excess engine torque resulting from the increasing airflow is then adjusted via the electric motor coupled to the engine, thereby charging the battery. As such, when the modified airflow decreases less than expected, and causes the engine to produce more torque than is expected by the operator, a "run-on" feel may be experienced by the operator. This may degrade the vehicle's drivability and the operator's overall drive experience. Thus by absorbing the excess torque, the "run-on" feel can be reduced and overall vehicle drivability can be improved. In addition, the requested deceleration may be provided with reduced surge occurrence.

By limiting the engine torque while using the battery to absorb the excess wheel torque during the deceleration, surge is addressed while reducing reliance on a compressor bypass valve (CBV). For example, the vehicle system may address surge even when the system does not include a CBV. In other examples, smaller CBV adjustments may be used, reducing excessive cycling of the CBV. As an example, responsive to the indication of surge, the controller may determine nominal boost actuator settings, such as settings for one or more of a waste gate coupled to an exhaust turbine of the turbocharger and the CBV coupled to an intake compressor of the turbocharger to reduce boost based on the torque demand. This may include, for example, increasing an opening of the CBV and/or the waste gate valve. By increasing the opening of the waste gate valve, exhaust pressure upstream of the turbine is reduced, reducing turbine speed and peak power. Likewise, by increasing an opening of the CBV, boost pressure from downstream of the compressor can be dumped to upstream of the compressor. This not only reduces boost pressure delivered to the engine intake but also reduces the pressure ratio across the compressor, moving the compressor away from a surge limit (and increasing the margin to surge). The controller may use the smaller CBV adjustment to increase compressor flow and mitigate a portion of the surge, and use engine torque and motor torque adjustments to increase engine airflow and mitigate the remaining portion of the surge.

In this way, during an increase in driver demand, a vehicle controller may discharge a battery to a state of charge based on a predicted margin to surge at a subsequent decrease in driver demand; and then, during the subsequent decrease in driver demand, limiting an engine torque based on an actual margin to surge, and charging the battery by absorbing powertrain torque in excess of the decreased driver demand. The predicted margin to surge may be based on the increase in driver demand, while discharging the battery to the state of charge includes discharging the battery from an initial state of charge to a final state of charge, wherein the final state of charge is further based on the initial state of charge at a time of the increase in driver demand, the final state of charge lowered as one or more of the initial state of charge increases and the predicted margin to surge at the subsequent decrease in driver demand decreases. Limiting engine torque based on an actual margin to surge may include adjusting one or more engine torque actuators to maintain a compressor inlet pressure below a surge pressure, the one or more engine torque actuators include an intake throttle, an exhaust waste gate valve, and a fuel injector. Limiting the engine torque may include reducing an opening of the intake throttle to a larger opening than required for the decreased driver demand, and adjusting the fuel injection based on the reduced intake throttle opening.

FIG. 5 depicts an example block diagram 500 of a control algorithm that may be used by the controller to meet driver torque demand while addressing compressor surge and related NVH constraints based on surge limits and battery charging limits.

At block 502, a torque demand is received from the operator, for example, based on a pedal position. An engine torque constraint may be calculated at block 503 based on factors such as compressor pressure ratio, surge limit, and a state of charge of a battery coupled to an electric motor, the motor coupled to the engine. Still other factors include a compressor flow rate, and a compressor inlet temperature. For example, based on modeled data, it may be determined if the torque demand requested at 502 is likely to affect the compressor flow such that the compressor ratio is moved towards a surge region. In one example, based on a drop in torque demand, a corresponding drop in intake airflow demand (e.g., a desired closing of the throttle) may be determined, and the controller may predict if the desired drop in intake airflow demand can lead to compressor surge. For example, the desired throttle closing rate can lead to a decreased compressor flow rate and a shift of the compressor ratio to the left of the surge line on a compressor map (such as line 402 of FIG. 4). Accordingly, the engine torque amount may be limited (e.g., throttle closure may be constrained, thereby constraining the drop in engine intake airflow).

The limiting engine torque is converted to an air demand. Then, the air is used to calculate a throttle position to be used for throttle control. In addition to determining an amount of throttle opening, a rate of decreasing the throttle opening may also be determined. For example, the rate may be constrained based on the surge limit.

The initial torque demand and the surge limited engine torque are then compared to calculate a torque demand delta/difference 504 that needs to be addressed by alternate means than engine intake airflow. In particular, a desired negative motor torque based on the torque difference that needs to be met via the electric motor is determined. With reference to the above example, as a result of limiting the engine torque, more torque may be expected to be delivered by the engine (e.g., via the intake throttle) than demanded. The difference between the two, that is the excess torque in this example, is the torque demand needed to be addressed via the electric motor. Herein, this corresponds to a negative torque that needs to be provided by the electric motor.

The negative torque that is desired from the electric motor is then adjusted based on an authority constraint 505 to determine the electric motor torque that can actually be provided. In particular, it may be determined if the motor has sufficient authority to meet the requested decrease in torque demand. In one example, the authority is determined based on the state of charge of a battery coupled to the electric motor. Based on the state of charge of the battery, and thereby its charging potential, the amount of negative motor torque that can be applied is determined at 505. If any additional negative torque is required, one or more other engine torque actuators may be adjusted (e.g., spark timing may be retarded, cam timing may be adjusted) at 507 based on their authority constraint. In one example, where the engine torque actuator is spark timing, it may be determined if spark can be retarded (e.g., from MBT) to reduce torque. There may be combustion stability limitations on how far spark can be retarded that may limit the amount of engine torque reduction that can be attained via the spark actuator. In another example, where the actuator is cam timing, it may be determined if intake or exhaust cam timing adjustments are limited. In one example, it may be possible to adjust cam timing to delay intake valve opening from TDC and/or delay intake valve closing from BDC to reduce torque. However, if any of the cams are already at a position limit, further adjustments may not be possible.

Various permutations of the control approach of FIG. 5 are possible. For example, all calculations could be done in the torque or air domains before distribution to actuators. Also, the various signals can be ramped in and out, limited, etc., to meet drivability and torque monitor requirements.

Figure 6:
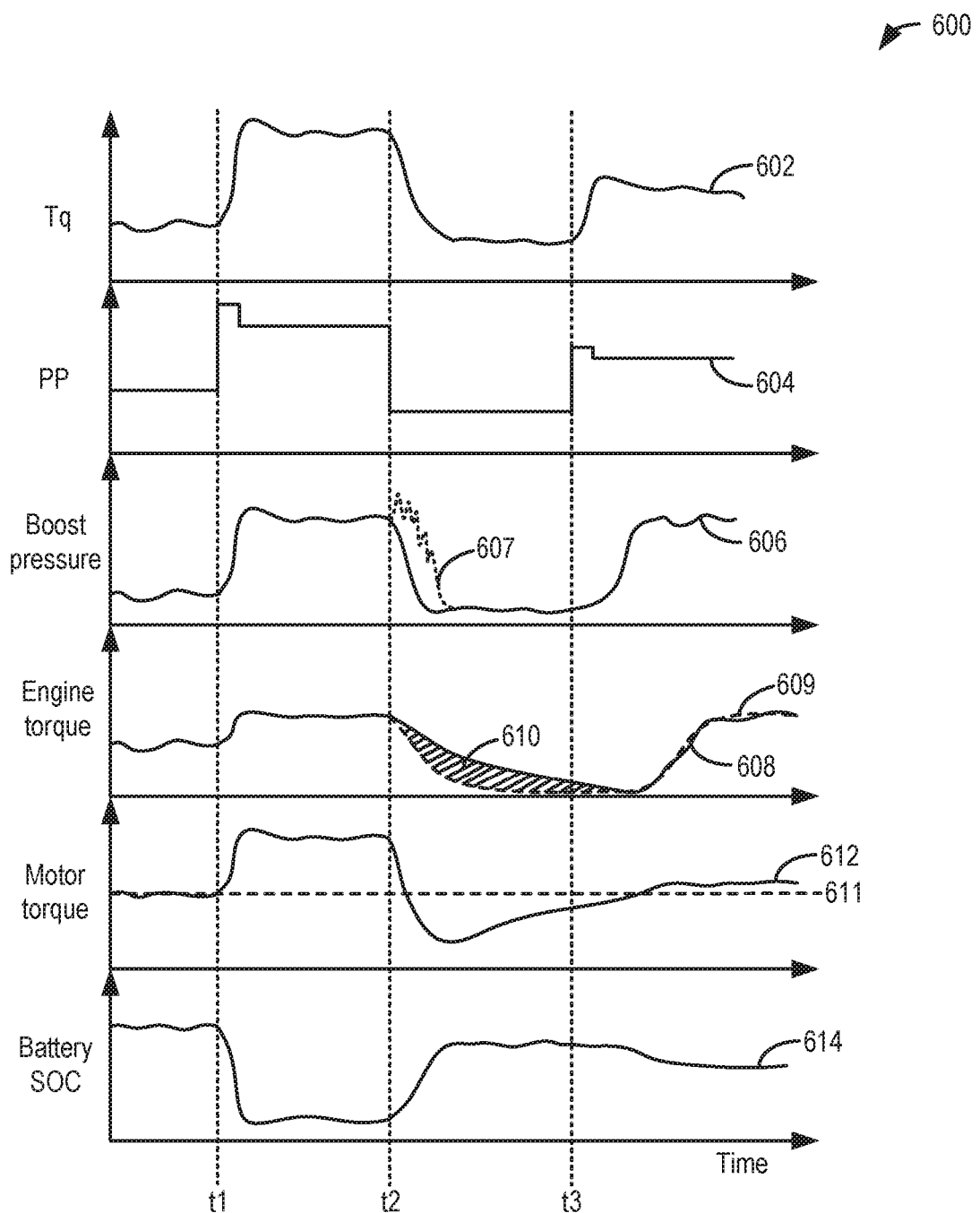
FIG. 6 shows an example motor torque adjustment according to the present disclosure.

Turning now to FIG. 6, an example engine torque and motor torque adjustment is shown at map 600. Specifically, map 600 depicts vehicle wheel torque output at plot 602, pedal position at plot 604, boost pressure at plot 606, engine output torque at plot 608, electric motor torque applied on the driveline at plot 612, and a battery state of charge (SOC) at plot 614. All graphs are plotted over time, along the x-axis. As used herein, the wheel torque reflects the torque demanded by the vehicle operator and may correlate with vehicle speed.

Prior to t1, the vehicle may be operated with low torque demand, as indicated by the accelerator pedal being depressed by a smaller amount. To meet this torque demand, the engine is operated boosted, with a lower boost pressure. In addition, the torque demand is met using engine torque only.

At t1, the vehicle operator tips in, thereby requesting a higher torque output. The pedal displacement at this tip-in is higher, and includes a tip-in to a higher final torque. Thus, a controller may anticipate that a drop in torque demand during a subsequent tip-out may also be higher, and compressor surge is anticipated at that tip-out. However, due to the battery SOC being higher, the charging potential of the battery at that tip-out is predicted to be lower. Accordingly, at t1, the higher torque demand may be met using a higher ratio of motor torque to engine torque. Specifically, engine torque is increased to meet the torque demand, such as by providing a correspondingly higher engine intake airflow, and with a corresponding increase in boost pressure. At the same time, motor torque from an electric motor is also increased. The increase in motor torque is higher than the increase in engine torque, and a larger portion of the demanded torque is provided via the electric motor. As a result of the increased motor torque usage, the battery SOC is drained to a significantly lower SOC, improving the battery's charging potential. The engine may be operated with boost and with the higher motor torque to engine torque to meet the higher torque demand during the tip-in.

At t2, the operator may release the pedal, confirming a tip-out event. The drop in driver demand at t2 may be substantially equal to or higher than the anticipated drop in driver demand. In response to the tip-out event, the driver torque demand may drop. In addition, compressor surge is anticipated at the tip-out. The controller may open a waste gate valve to reduce boost pressure responsive to the tip-out. To reduce the likelihood of compressor surge, the controller may limit the engine torque output based on a surge limit of the compressor to maintain compressor operation outside a hard surge region. Specifically, as shown at plot 608 (solid line), the controller may provide greater engine torque than is demanded. In one example, the controller may reduce the intake throttle opening at a slower rate and to a higher degree of opening than is desired for the drop in driver demand. The controller may also adjust fuel injection based on the engine airflow adjustment to maintain engine operation at a desired air-fuel ratio (e.g., at stoichiometry or rich or lean, as determined by the operating conditions). As such, if the engine output were reduced to the desired output (dashed line 609), there may be a surge in boost pressure, as shown by segment 607 (dashed line).

In the absence of any additional torque adjustments, the engine torque limiting for surge control would result in excess engine torque being generated. As such, the amount of excess torque generated is based on the difference between the demanded engine torque and the provided engine torque, as shown by shaded segment 610. To absorb the excess torque, the controller may actuate and apply a load from the electric motor so as to apply negative torque (as shown in relation to dashed, zero torque reference line 611) on the driveline. At the same time, the battery is charged and the SOC of the battery is raised. The negative torque applied is proportional to the difference between the demanded torque and the surge limited engine torque (that is, based on shaded region 610). Specifically, a larger negative torque may be applied as the extent of limiting engine torque above the desired engine torque becomes higher, and as the area of shaded region 610 increases. While applying negative torque from the electric motor on the engine while providing a greater than demanded torque from the engine, the net torque output provided may match the torque demand. By limiting the engine torque responsive to the indication of surge at the tip-out, compressor surge is averted. At the same time, by charging the battery, wheel torque is maintained at the driver demanded torque, improving drivability. In this way, compressor surge may be addressed during a tip-out while meeting torque demand and without degrading operator drive feel.

At t3, the operator may re-apply the pedal, increasing the torque demand. The pedal displacement at this tip-in is lower, and includes a tip-in to a lower final torque. Thus, the controller may anticipate that a drop in torque demand during a subsequent tip-out may also be lower, and compressor surge is not anticipated at that tip-out. Accordingly, at t3, the higher torque demand may be met using a higher ratio of engine torque to motor torque. Specifically, engine torque is increased to meet the torque demand, such as by providing a correspondingly higher engine intake airflow, and with a corresponding increase in boost pressure. At the same time, motor torque from an electric motor is also increased. The increase in engine torque is higher than the increase in motor torque, and a larger portion of the demanded torque is provided via the engine. As a result of the relatively lower motor torque usage, the battery SOC is drained by a smaller amount. The engine may be operated with boost and with the lower motor torque to engine torque to meet the higher torque demand during the tip-in.

In this way, engine torque output can be modified to reduce compressor surge. By limiting engine torque during a tip-out event such that engine torque is decreased by a smaller amount, and optionally at a slower rate, a pressure differential across a compressor can be reduced, moving the compressor ratio (or compressor flow) further away from a surge limit. As such, this reduces surge related issues, such as NVH, drivability, and turbocharger performance issues. By concurrently applying negative torque from an electric motor, a system energy storage device can be used to absorb the excess wheel torque resulting from limiting of the engine torque. By discharging the energy storage device to a lower state of charge during vehicle operation prior to the tip-out, the charge absorbing ability of the device during the compressor surge is increased. The technical effect of operating the vehicle with increased motor torque usage, even during conditions when motor torque would otherwise not have been used, is that the charging potential of the system during surge is improved. As such, this improves the ability of the vehicle system to be operated with engine torque limited to the surge limit, without incurring a "run-on" feel. The technical effect of addressing surge using engine torque and motor torque adjustments only is that the reliance on a compressor bypass valve is reduced. This reduces costs, complexity, warranty issues, and inefficiencies associated with operation of the CBV. Overall, surge is reduced while providing the demanded wheel torque and without degrading vehicle drivability.

In one example, a method for a hybrid vehicle comprises: in anticipation of compressor surge, operating the vehicle with a higher ratio of motor torque to engine torque; and in response to compressor surge, operating the vehicle with engine torque limited based on a surge limit, and motor torque adjusted based on the engine torque relative to a driver demand. In the preceding example, additionally or optionally, the higher ratio of motor torque to engine torque is based on a state of charge of an energy storage device coupled to an electric motor providing the motor torque, the ratio of motor torque to engine torque increased as the state of charge of the energy storage device increases. In any or all of the preceding examples, additionally or optionally, the higher ratio of motor torque to engine torque is further based on an anticipated margin to compressor surge, the ratio of motor torque to engine torque increased as the anticipated margin to compressor surge decreases, wherein the anticipated margin to compressor surge is based on one or more of a compressor inlet pressure relative to a surge pressure, a compressor flow relative to a surge flow, and a compressor pressure ratio relative to a surge ratio. In any or all of the preceding examples, additionally or optionally, operating the vehicle with the higher ratio of motor torque to engine torque includes discharging the energy storage device to a lower state of charge, the lower state of charge based on a charging potential during the compressor surge. In any or all of the preceding examples, additionally or optionally, the lower state of charge is decreased as the charging potential during the anticipation of compressor surge increases. In any or all of the preceding examples, additionally or optionally, the anticipation of compressor surge is determined responsive to an operator pedal tip-in event and wherein the charging potential during the anticipation of compressor surge is based on a predicted drop in driver demand during an operator pedal tip-out event following the operator pedal tip-in event. In any or all of the preceding examples, additionally or optionally, the predicted drop in driver demand is based on a degree of pedal displacement during the operator pedal tip-in event, the predicted drop in driver demand increased as the degree of displacement increases. In any or all of the preceding examples, additionally or optionally, the charging potential increases as one or more of the predicted drop in driver demand increases, and as a predicted initial boost pressure at a time of the operator pedal tip-out event increases. In any or all of the preceding examples, additionally or optionally, operating the vehicle with engine torque limited based on a surge limit includes adjusting one or more engine torque actuators to maintain one or more of the compressor inlet pressure below the surge pressure, the compressor flow relative below the surge flow, and the compressor pressure ratio below the surge ratio, wherein the one or more engine torque actuators include an intake throttle, an exhaust waste gate valve, and a fuel injector. In any or all of the preceding examples, additionally or optionally, adjusting the one or more engine torque actuators includes one or more of reducing an opening of the intake throttle, increasing an opening of the exhaust waste gate valve, and reducing fuel injection. In any or all of the preceding examples, additionally or optionally, the motor torque adjusted based on the engine torque relative to a driver demand includes calculating an excess wheel torque based on the limited engine torque relative to the driver demand, and applying negative motor torque corresponding to the excess wheel torque from the electric motor while charging the energy storage device.

Another method for a hybrid vehicle comprises: during an increase in driver demand, discharging a battery to a state of charge based on a predicted margin to surge at a subsequent decrease in driver demand; and during the subsequent decrease in driver demand, limiting an engine torque based on an actual margin to surge, and charging the battery by absorbing powertrain torque in excess of the decreased driver demand. In the preceding example, additionally or optionally, the predicted margin to surge is based on the increase in driver demand, and wherein discharging the battery to the state of charge includes discharging the battery from an initial state of charge to a final state of charge, wherein the final state of charge is further based on the initial state of charge at a time of the increase in driver demand, the final state of charge lowered as one or more of the initial state of charge increases and the predicted margin to surge at the subsequent decrease in driver demand decreases. In any or all of the preceding examples, additionally or optionally, limiting engine torque based on an actual margin to surge includes adjusting one or more engine torque actuators to maintain a compressor inlet pressure below a surge pressure, the one or more engine torque actuators include an intake throttle, an exhaust waste gate valve, and a fuel injector. In any or all of the preceding examples, additionally or optionally, limiting the engine torque includes reducing an opening of the intake throttle to a larger opening than required for the decreased driver demand, and adjusting the fuel injection based on the reduced intake throttle opening.

Another example method for a hybrid vehicle comprises: during a first tip-in where a margin to surge is higher, operating the vehicle with a battery being discharged at a slower rate, and a remainder of driver demand being provided via engine torque; and during a second tip-in where the margin to surge is lower, operating the vehicle with the battery being discharged at a faster rate, and a remainder of driver demand being provided via the engine torque. In the preceding example, additionally or optionally, the vehicle includes a turbocharged engine, wherein the first and second tip-ins are to a common boost pressure, and wherein an exhaust waste gate valve is actuated to a more open position during the second tip-in as compared to the first tip-in. In any or all of the preceding examples, additionally or optionally, the method further comprises: during a first tip-out following the first tip-in, in response to no indication of surge, opening an exhaust waste gate valve by a larger amount, increasing a degree of intake throttle closure, and charging the battery by a smaller amount; and during a second tip-out following the second tip-in, in response to an indication of surge, opening an exhaust waste gate valve by a smaller amount, decreasing a degree of intake throttle closure, and charging the battery by a larger amount. In any or all of the preceding examples, additionally or optionally, at each of the first and the second tip-out, a battery state of charge is lower than a threshold, the method further comprising: during a third tip-out following the first or the second tip-in, in response to an indication of surge and the battery state of charge being higher than the threshold, opening the exhaust waste gate valve by the larger amount, increasing the degree of intake throttle closure, and retarding spark timing. In any or all of the preceding examples, additionally or optionally, the method further comprises: during each of the first and the third tip-out, opening a compressor bypass valve to increase recirculation of boosted air charge across an intake compressor, and during the second tip-out, maintaining the compressor bypass valve closed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
   in anticipation of compressor surge, during a tip-in to a higher torque and with a battery at a higher state of charge, operating the vehicle with a higher ratio of motor torque to engine torque; and
   in response to compressor surge, operating the vehicle with engine torque limited based on a surge limit, and motor torque adjusted based on the engine torque relative to a driver demand.

2. The method of claim 1, wherein the higher ratio of motor torque to engine torque is based on a battery state of charge, the battery coupled to a motor providing the motor torque; and wherein a ratio of motor torque to engine torque is increased as the battery state of charge increases.

3. The method of claim 2, wherein the higher ratio of motor torque to engine torque is further based on an anticipated margin to compressor surge, the ratio of motor torque to engine torque increased as the anticipated margin to compressor surge decreases, wherein the anticipated margin to compressor surge is based on one or more of a compressor inlet pressure relative to a surge pressure, a compressor flow relative to a surge flow, and a compressor pressure ratio relative to a surge ratio.

4. The method of claim 1, wherein operating the vehicle with the higher ratio of motor torque to engine torque includes discharging the battery to a lower state of charge, the lower state of charge based on a charging potential during the compressor surge.

5. The method of claim 4, wherein the lower state of charge is decreased as the charging potential during the compressor surge increases.

6. The method of claim 4, wherein the charging potential during the compressor surge is based on a predicted drop in driver demand during an operator pedal tip-out event following the tip-in.

7. The method of claim 6, wherein the predicted drop in driver demand is based on a degree of boosting during the tip-in, the predicted drop in driver demand increased as the degree of boosting increases.

8. The method of claim 6, wherein the charging potential during the compressor surge increases as one or more of the predicted drop in driver demand increases and a predicted initial boost pressure at a time of the operator pedal tip-out event increases.

9. The method of claim 3, wherein operating the vehicle with engine torque limited based on a surge limit includes adjusting one or more engine torque actuators to maintain one or more of the compressor inlet pressure below the surge pressure, the compressor flow above the surge flow, and the compressor pressure ratio below the surge ratio, wherein the one or more engine torque actuators include an intake throttle, a camshaft timing actuator, an exhaust waste gate valve, and a fuel injector.

10. The method of claim 9, wherein adjusting the one or more engine torque actuators includes one or more of reducing an opening of the intake throttle, increasing an opening of the exhaust waste gate valve, and reducing fuel injection.

11. The method of claim 2, wherein the motor torque adjusted based on the engine torque relative to a driver demand includes calculating an excess wheel torque based on the limited engine torque relative to the driver demand, and applying negative motor torque corresponding to the excess wheel torque from the motor while charging the battery.

12. A method for a hybrid vehicle, comprising:
during an increase in driver demand, discharging a battery to a state of charge based on a predicted margin to surge at a subsequent decrease in driver demand; and
during the subsequent decrease in driver demand, limiting an engine torque based on an actual margin to surge, and charging the battery by absorbing powertrain torque in excess of the decreased driver demand.

13. The method of claim 12, wherein the predicted margin to surge is based on the increase in driver demand, and wherein discharging the battery to the state of charge includes discharging the battery from an initial state of charge to a final state of charge, wherein the final state of charge is further based on the initial state of charge at a time of the increase in driver demand, the final state of charge lowered as one or more of the initial state of charge increases and the predicted margin to surge at the subsequent decrease in driver demand decreases.

14. The method of claim 12, wherein limiting engine torque based on an actual margin to surge includes adjusting one or more engine torque actuators to maintain a compressor inlet pressure below a surge pressure, the one or more engine torque actuators include an intake throttle, a camshaft timing actuator, an exhaust waste gate valve, and a fuel injector.

15. The method of claim 14, wherein limiting the engine torque includes reducing an opening of the intake throttle to a larger opening than required for the decreased driver demand, and adjusting fuel injection based on the reduced intake throttle opening.

16. A method for a hybrid vehicle, comprising:
during a first tip-in event where a margin to surge is higher and prior to an indication of surge, operating the vehicle with a battery being discharged at a slower rate, and a remainder of driver demand being provided via engine torque; and
during a second tip-in event where the margin to surge is lower and prior to an indication of surge, operating the vehicle with the battery being discharged at a faster rate, and a remainder of driver demand being provided via the engine torque.

17. The method of claim 16, wherein the vehicle includes a turbocharged engine, wherein the first and second tip-ins are to a common boost pressure, and wherein an exhaust waste gate is actuated to a more open position during the second tip-in as compared to the first tip-in.

18. The method of claim 17, further comprising:
during a first tip-out following the first tip-in, in response to no indication of surge, opening the exhaust waste gate by a larger amount, increasing a degree of intake throttle closure, and charging the battery by a smaller amount; and
during a second tip-out following the second tip-in, in response to an indication of surge, opening the exhaust waste gate by a smaller amount, decreasing a degree of intake throttle closure, and charging the battery by a larger amount.

19. The method of claim 18, wherein at each of the first and second tip-outs, a battery state of charge is lower than a threshold, the method further comprising: during a third tip-out following the first or the second tip-in, in response to the indication of surge and the battery state of charge being higher than the threshold, opening the exhaust waste gate by the larger amount, increasing the degree of intake throttle closure, and retarding spark timing.

20. The method of claim 19, further comprising, during each of the first and the third tip-out, opening a compressor bypass valve to increase recirculation of boosted air charge across an intake compressor, and during the second tip-out, maintaining the compressor bypass valve closed.

* * * * *